United States Patent
Tran et al.

(10) Patent No.: US 12,548,242 B2
(45) Date of Patent: Feb. 10, 2026

(54) TECHNIQUES FOR IMPROVED GRAPHICS ON DEVICES WITH LIMITED GRAPHICS PROCESSING CAPABILITIES

(71) Applicant: NetEase Information Technology Corporation, Pasadena, CA (US)

(72) Inventors: Ray Tran, London (GB); John Elliot Meier, Bothell, WA (US); Brian Neal, Los Angeles, CA (US); Ross Alan Gardner, Irvine, CA (US)

(73) Assignee: NetEase Information Technology Corporation, Pasadena, CA (US)

( * ) Notice: Subject to any disclaimer, the term of this patent is extended or adjusted under 35 U.S.C. 154(b) by 238 days.

(21) Appl. No.: 18/367,725

(22) Filed: Sep. 13, 2023

(65) Prior Publication Data

US 2025/0086886 A1  Mar. 13, 2025

(51) Int. Cl.
  *G06T 15/50* (2011.01)
  *G06T 1/20* (2006.01)
  *G06T 15/04* (2011.01)
  *G06T 15/06* (2011.01)

(52) U.S. Cl.
  CPC .............. *G06T 15/506* (2013.01); *G06T 1/20* (2013.01); *G06T 15/04* (2013.01); *G06T 15/06* (2013.01)

(58) Field of Classification Search
  CPC ........... G06T 15/06; G06T 15/04; G06T 1/20; G06T 2215/16; G06T 15/50; G06T 15/60; G06T 2215/12; G06F 3/0484
  See application file for complete search history.

(56) References Cited

U.S. PATENT DOCUMENTS

| | | |
|---|---|---|
| 2017/0178272 A1 | 6/2017 | Lashkari |
| 2020/0302684 A1* | 9/2020 | Sunkavalli ................ G06T 7/40 |
| 2021/0279947 A1* | 9/2021 | Castaneda ............. G06T 15/506 |
| 2023/0177760 A1* | 6/2023 | Wahrenberg ........... G16H 30/40 |
| | | 345/502 |

* cited by examiner

*Primary Examiner* — Hau H Nguyen
(74) *Attorney, Agent, or Firm* — Hickman Becker Bingham Ledesma LLP; Stephen J. Walder, Jr.

(57) ABSTRACT

Techniques are provided for dividing the work involved in rendering a high quality depiction of a virtual scene between a local device and a cloud-based system in a manner that leverages the computing power of both. Specifically, the client applications request lighting information, from a cloud-based system, for a specific scene/configuration combination to be depicted. The cloud-based system either generates the requested lighting information, or provides it from a cloud-based cache. The local device renders a depiction of the scene/configuration combination based on the lighting information thus obtained from the cloud. The lighting information may be used by the client over multiple frames of the scene, until an event changes the scene/configuration that is being depicted. At that point, the client application may obtain from the cloud a new set of lighting information for the new scene/configuration combination.

20 Claims, 5 Drawing Sheets

IMAGE 200

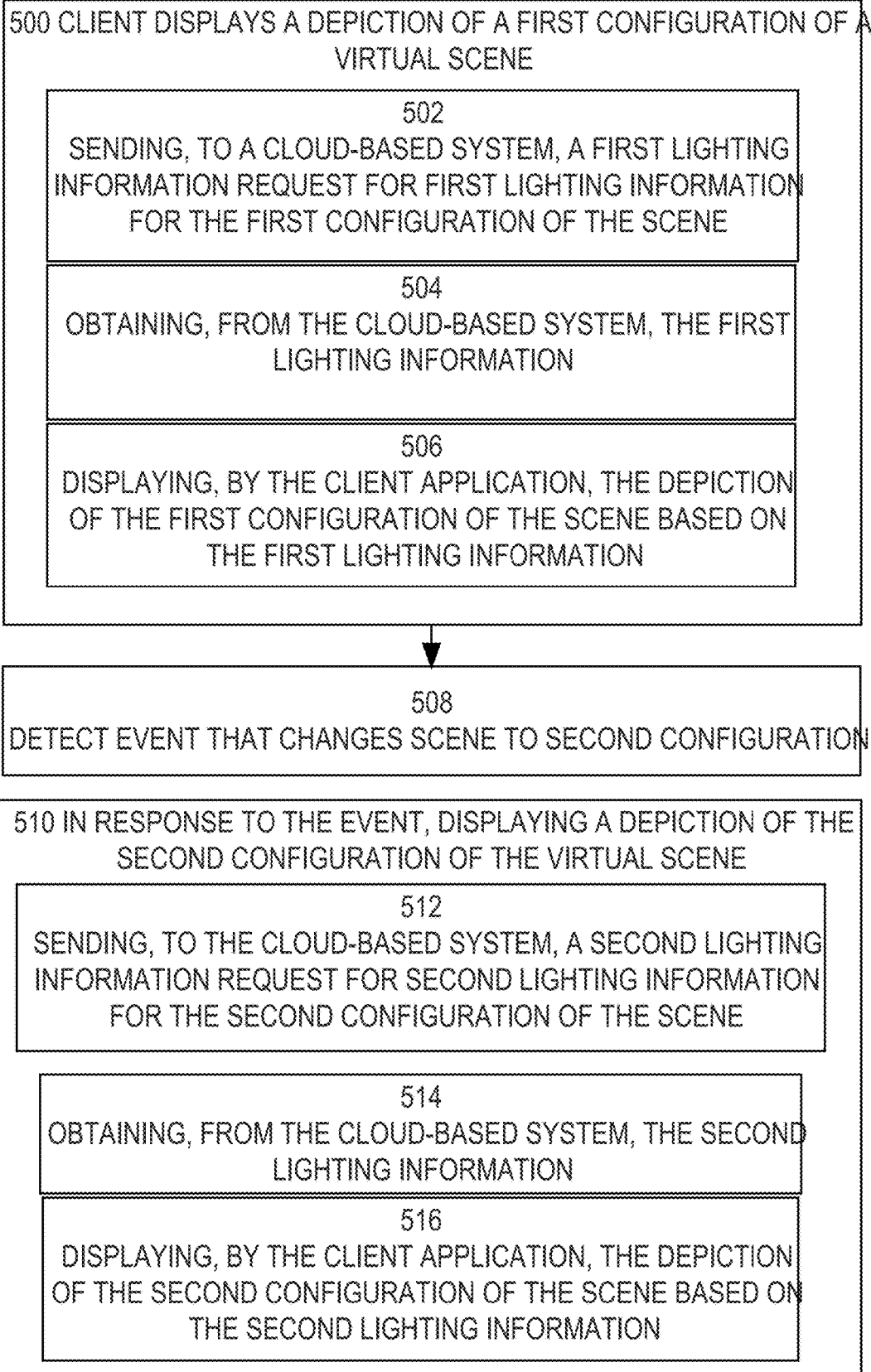

TECHNIQUES FOR IMPROVED GRAPHICS ON DEVICES WITH LIMITED GRAPHICS PROCESSING CAPABILITIES

FIELD OF THE INVENTION

The present invention relates to generating digital depictions of virtual scenes and, more specifically, to generating high quality depictions of virtual scenes on devices with limited graphics processing capabilities.

BACKGROUND

Personal computers have significantly more computer resources than mobile devices. Not only do personal computers have larger screens than mobile devices, personal computers also tend to have more powerful CPUs and graphics processors, and more volatile and persistent storage. Consequently, it has been challenging for the makers of graphics-intensive mobile applications, such as games, to approximate the graphics quality exhibited by their personal computer counterparts.

One technique for improving the depiction of virtual scenes is referred to as "lightmapping". In lightmapping, the brightness and color of light that is reflected off surfaces in a virtual scene is pre-calculated and stored in texture maps. When the scene is rendered, the texture maps of the corresponding lightmap are applied to the scene, making the lighting in the depicted scene appear more realistic. For example, white light bounced off red walls of a virtual room will illuminate other objects in the room with a redish light. Similarly, application of a lightmap will cause shadows to appear at locations where objects are blocking a light source of a virtual scene. Additional information relating to lightmaps may be found at en.wikipedia.org/wiki/Lightmap, the content of which is incorporated herein by this reference.

Because mobile devices typically do not have the computational power to calculate scene-specific lightmaps on-the-fly, lightmaps are pre-calculated based on the static geometry of the scene to which they correspond. Use of pre-calculated lightmaps in a mobile application works well for relatively static scenes. However, issues arise when the depicted scene is subject to change. For example, if an object is removed from the scene, the pre-calculated lightmap no longer works properly since the object is no longer occluding light, and no light is bouncing off the removed object. Similar issues arise if the color of the objects in the room change, since that would affect the color of the light that is bouncing off the objects onto other objects within the scene.

It is possible to pre-calculate multiple lightmaps for the same scene, allowing the application to transition between pre-calculated lightmaps in response to changes that occur within the rendered scene. However, unless the number of supported changes is extremely limited, the number of pre-calculated lightmaps quickly becomes unmanageable. For example, given a scene with 19 configurable objects, each of which has 3 types/patterns and 8 possible colors, the number of pre-calculated lightmaps needed to support every possible combination would be astronomical ($(3 \times 8)^{19}$).

Another option for obtaining high-quality graphics in a mobile application is to use cloud-based computing resources to perform on-the-fly per-frame rendering of virtual scenes. Using this technique, for every image frame that is to be displayed on the device, a new high-quality image of the scene is generated using cloud-based computing resources, and then sent to the mobile application for display. Unfortunately, the cloud-based per-frame on-the-fly rendering approach of displaying a scene on a mobile device is extremely expensive given the computational demand placed on the cloud-based resources. For example, cloud-based per-frame on-the-fly rendering may require one or more dedicated cloud-based GPUs per mobile user, and popular mobile games may have tens of thousands of simultaneous users, or more.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5 is a flowchart illustrating steps for generating displays of virtual scenes as the configuration of such scenes changes, according to an implementation.

DETAILED DESCRIPTION

Figure 1:
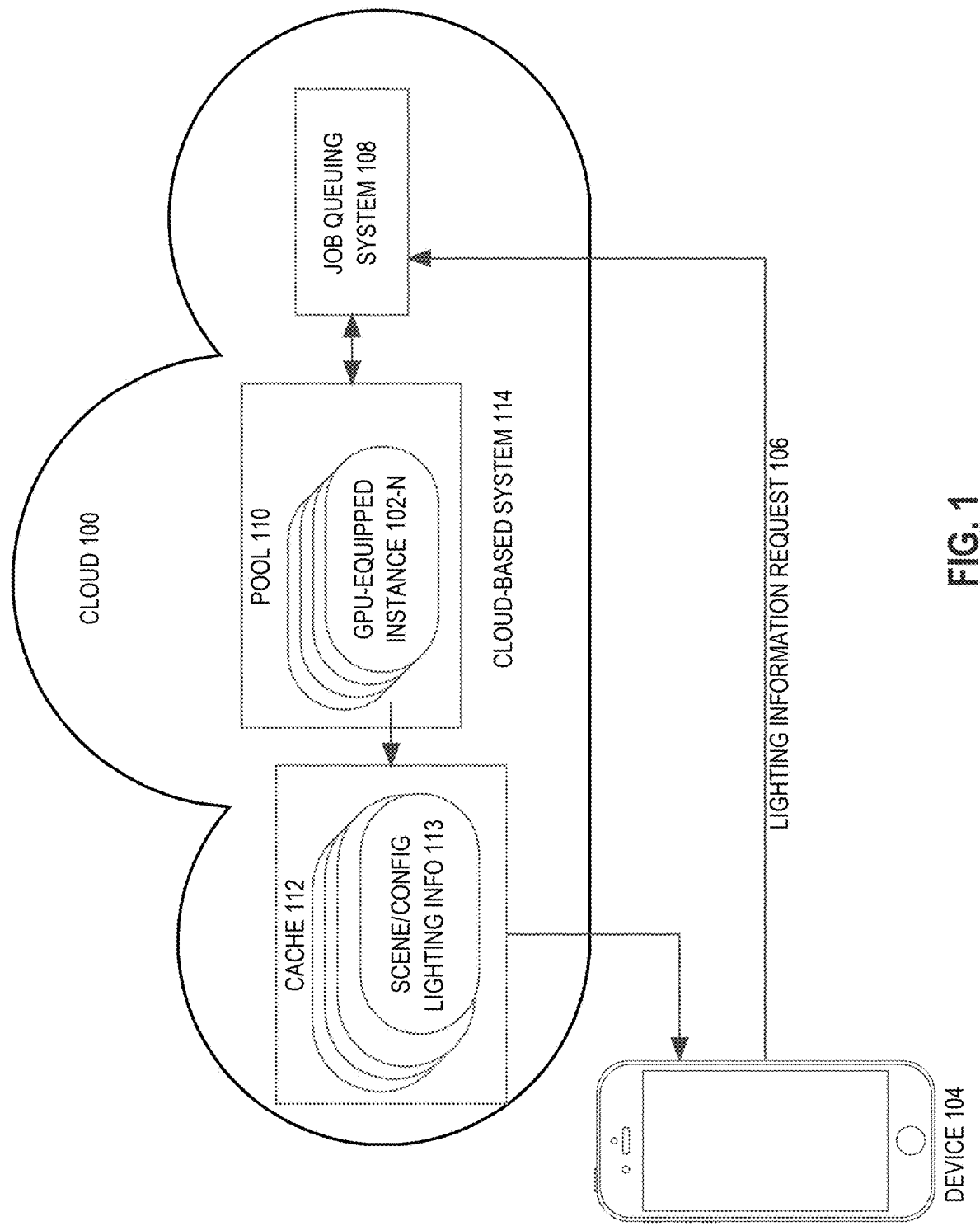
FIG. 1 is a block diagram of a system in which lighting information for specific scene/configuration combinations are generated by a cloud-based system and used by local devices to render high quality depictions of the scene/configuration, according to an implementation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To address the situation where local computing power is insufficient to perform on-the-fly per-frame rendering of virtual scenes, techniques are described herein for dividing the work involved in rendering a scene between the local device and a cloud-based system in a manner that leverages the computing power of both. Specifically, the client applications request per-scene/configuration lighting information from a cloud-based system, and the cloud-based system either generates the per-scene/configuration lighting information, or provides it from a cloud-based cache. Per-scene/configuration lighting information differs from per-frame images in that it includes only lighting information (and therefore involves far less data), and it needs only be regenerated when a configuration change occurs in a displayed scene (rather than every frame).

In one implementation of the cloud-based system described herein, cloud-based GPU-equipped instances are not dedicated to any particular local device. Instead, cloud-based GPU-equipped instances are maintained in a pool, where the pool may have significantly fewer GPU-equipped instances than the number of concurrently executing client application instances.

When a client application instance needs lighting information to be generated for a particular configuration of a particular scene ("target lighting information"), the local device sends a lighting information request for the target lighting information to the cloud-based system. Within the cloud-based system, a job queuing system responds to the lighting information request by assigning one or more GPU-equipped instances from the pool the task of generating the target lighting information. Upon completion of the task, the GPU-equipped instance(s) are returned to the pool, and the target lighting information is made available to the client application on the local device.

In some implementations, to avoid duplication of effort, the cloud-based system maintains a cache of the lighting information that it generates. When the cloud-based system receives a lighting information request from a client application instance on local device, the cloud-based system first determines whether the cache already has target lighting information specified in the request. If the target lighting information already exists in the cache, the previously generated target lighting information is made available to the requesting client application, without regenerating the same lighting information again.

While examples are given herein in a context where the client applications are mobile device games, the techniques described herein are not limited to that context. Rather, the techniques may be applied in any situation where any type of software application, running on any device, does not have sufficient computer power available to produce high-quality per-scene/configuration on-the-fly renderings of a scene. Thus, the techniques are equally applicable to applications running on older desktop computers and game consoles, as well as newer desktop computers and game consoles that have insufficient graphics capabilities.

Lighting Information

In one implementation, the lighting information that is generated using the techniques described herein are conventional lightmaps. However, conventional lightmaps are difficult to use on scenes involving dynamic objects such as characters. Therefore, in an alternative implementation, rather than use conventionally-rendered lightmaps, height-field cone tracing (HFCT) is combined with octahedral maps (light-field probes), as shall be described in greater detail hereafter.

Further information on the general topic of cone tracing can be found at en.wikipedia.org/wiki/Cone_tracing, the entire contents of which are incorporated herein by this reference.

Further information on a specific technique of HFCT can be found at advances.realtimerendering.com/s2012/CCP/Malan-Dust_514_GI_reflections(Siggraph2012).pptx, the entire contents of which is incorporated herein by this reference.

Further information on octahedral maps and light-field probes can be found at casual-effects.com/research/McGuire2017LightField/McGuire2017LightField-I3DSlides.pdf and knarkowicz.wordpress.com/2014/04/16/octahedronnormal-vector-encoding/, the entire contents of each of which is incorporated herein by this reference.

According to one implementation, HFCT is combined with octahedral maps, where the octahedral maps are used to determine the occlusion for the HFCT. In such an embodiment, the lit height fields and the octahedral maps are, collectively, the lighting information produced on the cloud and used by the local device to render high quality images of virtual scenes.

Operational Overview

Referring to FIG. 1, it is a block diagram of a cloud-based system for rendering improved graphics on devices with limited graphics processing capabilities. Specifically, in FIG. 1, a mobile device 104 is executing a client application that depicts a virtual scene. Such an application may be, for example, a game running on a mobile phone.

When the client application needs to render a particular configuration of a virtual scene, the client application causes device 104 to send a lighting information request 106 to a cloud-based system 114 executing within cloud 100. In the implementation illustrated in FIG. 1, the lighting information request is sent to a job queueing system 108 that is part of cloud-based system 114.

While FIG. 1 illustrates a single client device 104, cloud-based system 114 may be used to provide lighting information to concurrently executing client applications on thousands of such devices. Preferably, requests from all such devices are received by job queueing system 108, which itself may be distributed and parallelized. Job queueing system 108 may process the lighting information requests in an order based on rules. As a simple example, the order may be first-in-first-out (FIFO) based on the times at which the requests are received. Alternatively, the order may be based on additional criteria, such as priority of service, the specific scenes for which lighting information is requested, whether the lighting information is cached, etc.

When job queueing system 108 determines that it is time to process lighting information request 106, cloud-based system 114 may first determine whether the request 106 is for lighting information that already resides in a cloud-based cache 112. Cloud-based cache 112 may be implemented in a variety of ways. For example, cloud-based cache 112 may be implemented as a file-based flat storage system, or a more sophisticated Content Delivery Network (CDN) byte transfer download system. The techniques described herein are not limited to any particular cache implementation.

In the illustrated implementation, cache 112 contains scene/configuration-specific lighting information 113 for many scene/configuration combinations. If the request is for lighting information that already resides in cache 112, cloud-based system 114 causes device 104 to download the requested lighting information from cache 112. For example, cloud-based system 114 may send to device 104 a message that includes information that uniquely identifies scene/configuration-specific lighting information 113. Device 104 may use the information to download the scene/configuration-specific lighting information 113 from cloud 100.

On the other hand, if the request 106 is for scene/configuration-specific lighting information that does not currently reside in cache 112, then job queueing system 108 assigns one or more GPU-equipped instances 102N, from pool 110, to the task of generating the requested scene/configuration-specific lighting information. After the GPU-equipped instance(s) 102 complete the task of generating the requested scene/configuration-specific lighting information, the target scene/configuration-specific lighting information is stored in cache 112, and cloud-based system 114 causes the target scene/configuration-specific lighting information to be downloaded to device 104.

The GPU-equipped instance(s) 102 are then returned back to pool 110. Once returned to pool 110, the GPU-equipped instance(s) 102 may be assigned another task. For example, the GPU-equipped instance(s) may be subsequently assigned the task of generating scene/configuration-specific lighting information for a subsequent request from the same client application, or for a request from a client application running on any other client device.

Once device 104 downloads the target scene/configuration-specific lighting information, the client application uses the scene/configuration-specific lighting information to render a high-quality depiction of the target configuration of a virtual scene. Use of this same scene/configuration-specific lighting information may continue until the user of the client application performs some action that requires depiction of a different virtual scene, or alters the configuration of the currently depicted scene. If the change of scene or configuration requires lighting information that is not already available on the device 104, then the device 104 sends a subsequent lighting information request to cloud-based system 114, and the process described above is repeated.

Flow of Client Application Operation

FIG. 5 is a flow diagram of the operation of a client application according to one implementation. Referring to FIG. 5, the client displays a depiction of a first depiction of a virtual scene at step 500, detects an event that changes the virtual scene to a second configuration (step 508), and then depicts the virtual scene in the second configuration (step 510). However, because the client application may be running on a device with insufficient graphics capabilities, the client application offloads a significant amount of the rendering work to the cloud-based system. In particular, as illustrated in steps 502 and 504, the client application requests and receives lighting information for the first configuration of the scene from the cloud-based system. Consequently, in step 506, the client application displays the first configuration of the scene based on the lighting information thus received.

Similarly, in response to the configuration change in the scene, in steps 512 and 514 the client application requests and receives lighting information for the second configuration of the scene from the cloud-based system. Consequently, in step 516, the client application displays the second configuration of the scene based on the lighting information received from the cloud-based system in response to the second request.

Covering for Delays

Because the client application offloads the generation of lighting information to the cloud-based system, there is a round-trip of communication between the client application and the cloud-based system when an event causes the configuration of a virtual scene to change. This round-trip, combined with the time required for the cloud-based system to generate the needed lighting information, may result in a non-trivial delay.

According to one implementation, the client application may use any one of a variety of techniques to cover for this delay so that when a scene needs to be re-rendered. For example, to cover for the delay, the client application can use a visual effect to mask the loading time (e.g., a fade in/fade out, a pixelated swirling visual effect where the scene appears disassembled and reassembled, etc.) The techniques described herein are not limited to any particular technique for covering for the delay between re-rendering a scene in response to configuration changes.

Checking the Cache

As mentioned above, before generating the lighting information that is requested by a client application, cloud-based system 114 first determines whether the requested lighting information already exists in cache 112. Cloud-based system 114 may make this determination immediately upon receipt of a lighting information request, or when job queueing system 108 determines that it is time to process the request.

In one implementation, cloud-based system 114 uses a key mechanism to determine whether requests are for scene/configuration-specific lighting information 114 that is already in cache 112. For example, a unique key may be generated for each unique scene/configuration combination for which lighting information is generated. When scene/configuration-specific lighting information is stored in cache 112 for a given scene/configuration combination, the key for that scene/configuration combination may be stored in a data structure (such as a table or index) in conjunction with the location of the corresponding scene/configuration-specific lighting information.

Each lighting information request may include the unique key for the scene/configuration combination for which lighting information is requested. Alternatively, the request may include information from which cloud-based system 114 is able to derive the corresponding key. Once the key associated with a request is obtained, cloud-based system 114 determines whether the requested scene/configuration-specific lighting information is already in cache 112 by searching the data structure for an entry that corresponds to the key contained in each request.

In embodiments that use such a data structure is used to track the scene/configurations for which lighting information has been cached, cloud-based system 114 keeps the data structure in sync with the contents of cache 112. For example, if the lighting information for some scene/configuration combinations is deleted from cache 112 to free up space, then cloud-based system 114 updates the data structure to remove any entries associated that correspond to the deleted scene/configuration combinations.

Local Rendering of the Scene

Once the client application receives from cloud-based system 114 the lighting information needed to produce a high-quality rendering of a particular configuration of a scene/configuration, the client application renders the scene/configuration based on the lighting information thus obtained using the hardware available on the local device 104.

Figure 2:
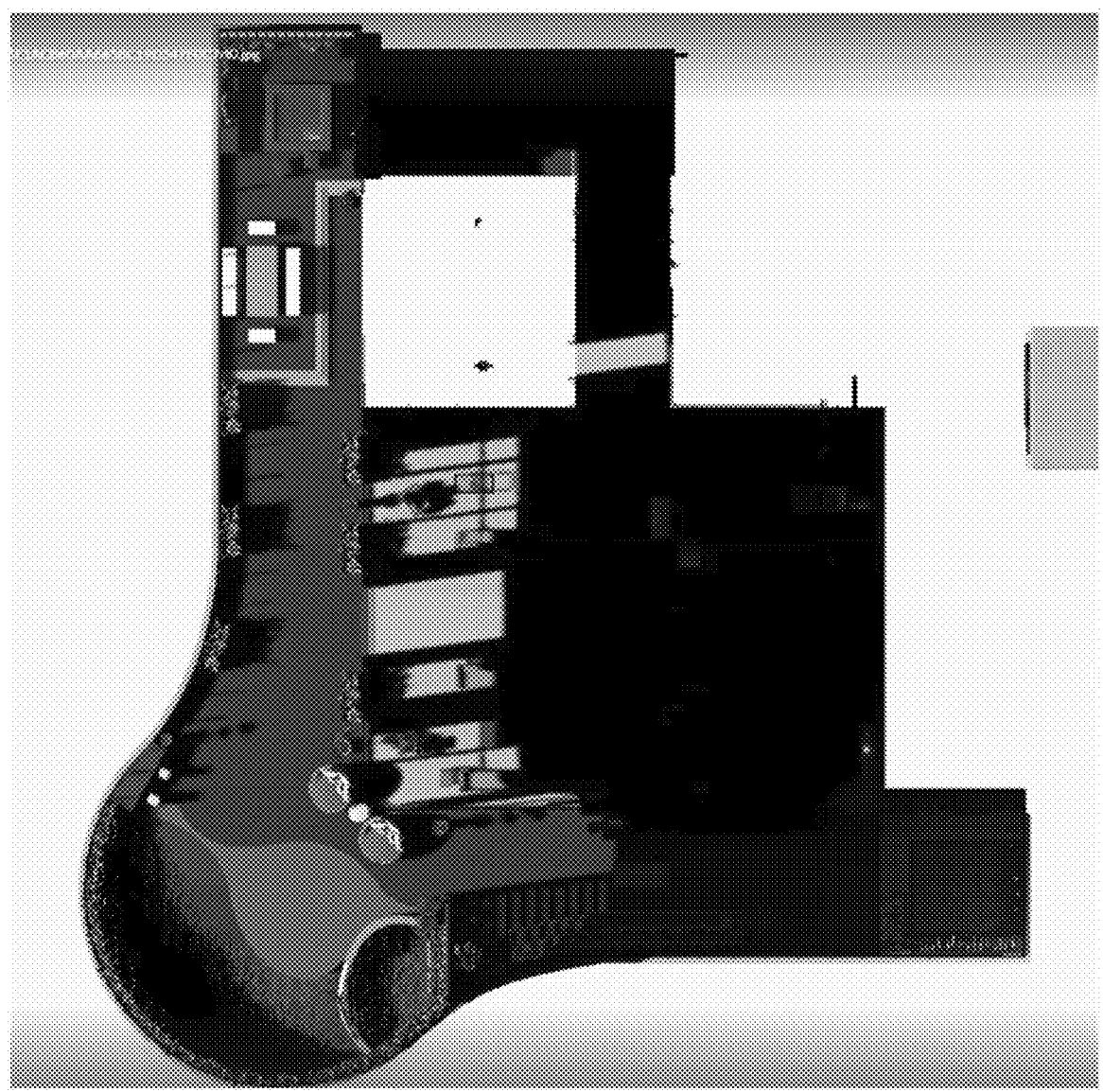
FIG. 2 is a block diagram of an image, generated by a cloud-based system, containing "from above" lighting information for a particular scene/configuration combination, according to an implementation.
Figure 3:
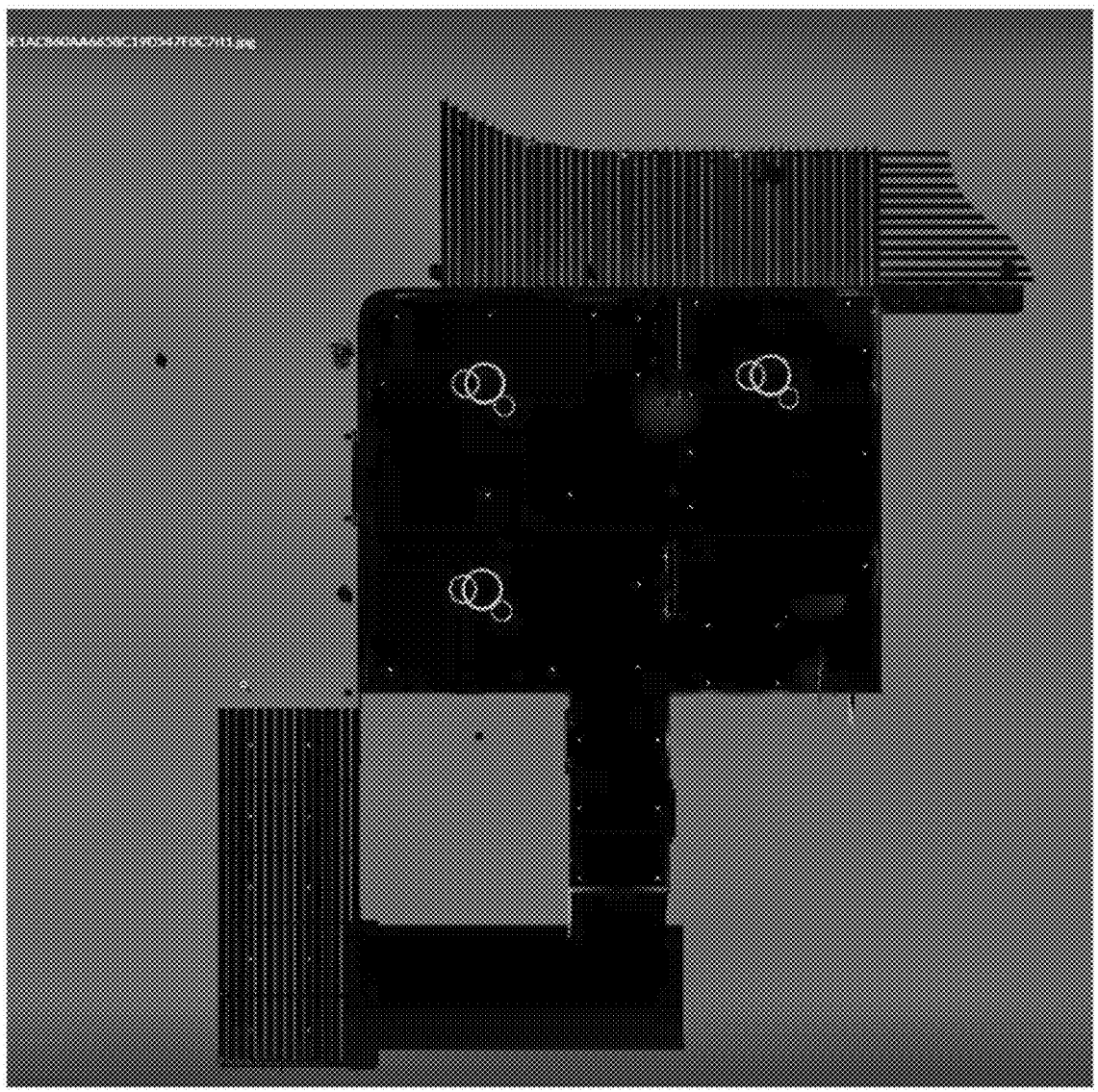
FIG. 3 is a block diagram of an image, generated by a cloud-based system, containing "from below" lighting information for the particular scene/configuration combination, according to an implementation.

In one implementation, the lighting information takes the form of lit height fields (images) and octahedral occlusion data. Referring to FIG. 2, it illustrates an image 200 (lit height field), generated by cloud-based system 114, that contains lighting information (global illumination data) for a particular configuration of a particular scene of a virtual environment. The lighting information generated by cloud-based system 114 may contain several such images for a particular scene/configuration combination, based on the number of layers supported by the client application. For example, image 200 reflects a particular scene/configuration combination lit from above, while image 300 in FIG. 3 illustrates the same particular scene/configuration combination lit from below. The lighting information for that particular scene/configuration combination may include both images 200 and 300.

The global illumination data reflects shadows, light bouncing off surfaces in the particular configuration of the particular scene, the colors of such reflected light, etc. The files for images 200 and 300 may also include buffers containing data that is not directly visible in images 200 and 300. For example, the files may include buffers containing octahedral maps that represent octahedral occlusion data.

The images 200 and 300 and their corresponding octahedral occlusion data will typically comprise far less data than conventional lightmaps and associated reflection maps and light probes (where the density of the light probes generally must be high to achieve good results). Thus, the transmission of images 200 and 300 between cloud-based system 114 and device 104 generates less traffic than would occur if the lighting information included conventional lightmaps/reflection maps/light probes. In one implementation, traffic is further reduced by compressing the lighting information prior to transmission of the lighting information from cloud-based system 114 to device 104. Reducing the amount of data exchanged between the cloud and local devices also reduces the latency between when a scene/configuration changes and when the client device's display reflects the scene/configuration change.

Within device 104, the lit height fields and octahedral occlusion data are passed into a shader which executes by combining the lit height fields with the octahedral occlusion data to generate a high quality image of the scene. The height-field cone tracing is then performed using a current height and a filtered height of its surroundings. Based on the current height and filtered height, the shader determines where, on the lit height field, the shader should sample.

Using cone sampling, the sample itself is an area which simulates a cone of samples. Based on this information, the shader running on device 104 is able to determine the irradiance that is coming in from a certain cone angle. The HFCT technique incorporated above is an example of a sampling algorithm that may be used by the shader executing on device 104. The shader may then scale back the contribution based on the corresponding occlusion, which is worked out from the octahedral occlusion data obtained from cloud-based system 114.

Cloud/Local Division of Work

Using the techniques described herein, the work associated with rendering a high-quality depiction of a virtual scene is split between local hardware and the cloud-based system. Specifically, the cloud-based system is responsible for generating the lighting information for each scene/configuration combination. The local hardware, on the other hand, is responsible for generating a high-quality depiction of the scene, on a frame-by-frame basis, based on that lighting information. Because the cloud-based system does not have to be called on a frame-by-frame basis, the communication traffic between the local devices and the cloud-based system 114 is significantly reduced, as is the cost of the cloud-based resources and the latency between rendered frames. On the other hand, the local device 104 is not asked to perform graphics manipulation that exceeds the capabilities of its hardware, while still being able to render high quality depictions of virtual scenes.

In the implementations discussed above, cloud-based system 114 is responsible for generating all of the lighting information, while device 104 renders the depiction of a scene/configuration combination based on that lighting information. However, in alternative implementations, the local hardware of device 104 may be responsible for generating at least some of the lighting information for a scene/configuration combination.

For example, in one implementation, cloud-based system 114 may generate the lighting information for a particular scene/configuration combination that includes a particular set of light sources. A user may perform an action that adds an additional light source (e.g. turn on a light in a virtual scene). Rather than cause cloud-based system 114 to generate a new set of lighting information in response to this change, device 104 may render the new light source directly into the lit height field of the existing lighting information (without requesting a new set of lighting information from cloud-based system 114). However, while it may be useful to allow the hardware of device 104 to directly generate some lighting information in this manner, involving device 104 too heavily in the generation of global lighting information will tax the graphical resources of device 104, and may result in unacceptably low frame rates, for example.

Cloud-Based On-the-Fly Rendering Vs Pre-Generation

In some cases, it is most efficient to perform cloud-based on-the-fly rendering of the lighting information for a particular configuration of a virtual scene. In other cases, it may be more efficient to pre-generate the lighting information for a configuration of a scene, and cache it in the cloud or locally.

An example of a scenario where cloud-based on-the-fly rendering of lighting information may be preferrable is where the scene is of an apartment. There may be so many permutations and ways a player can change/remove furniture or other aspects of the apartment that it is not feasible to pre-compute all the lighting information for all these permutations. Consequently, the lighting information generation is performed on-the-fly as a player updates the scene.

In contrast, examples of where it may be more efficient for the lighting information to be rendered in the cloud in advance, and then cached locally, are scenes in which there are relatively few dynamic changes in lighting. In such scenarios, the lighting information for the relatively few configurations may be pre-computed on the cloud and then stored locally. An example of this would be pre-computing lighting for various times of day/night. In such a scenario, only four different sets of lighting information may be needed to represent the different lighting configurations of a scene throughout the day. These four sets of lighting information could be pre-computed and cached locally.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
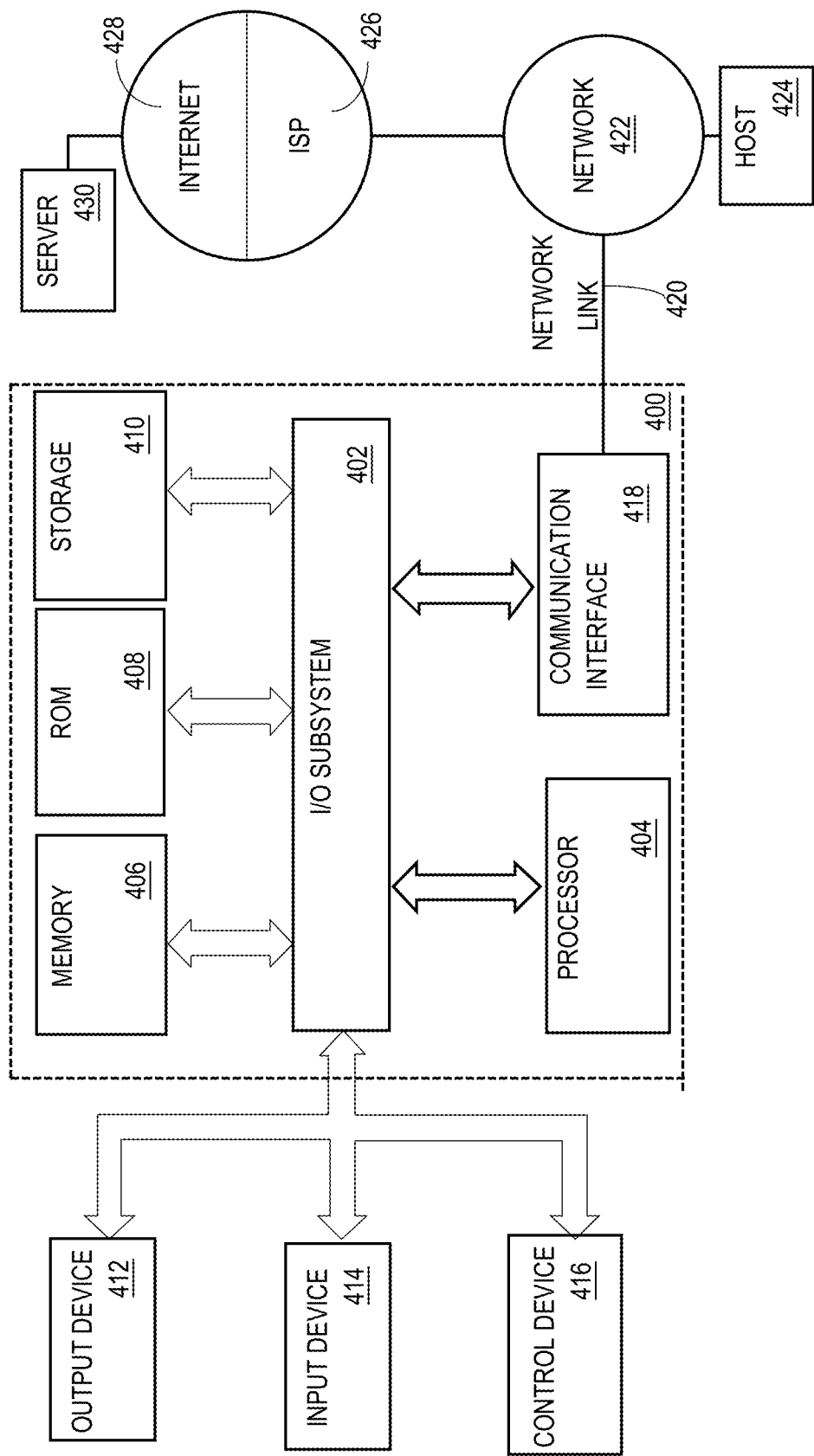
FIG. 4 is a block diagram of a computing device upon which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    executing a client application on a client device;
    displaying, by the client application, on a display associated with the client device, a depiction of a first configuration of a particular virtual scene at least by:
        sending, from the client device, a first lighting information request to a cloud-based system for first lighting information for the first configuration of the particular virtual scene;
        in response to the first lighting information request, the client application obtaining from the cloud-based system the first lighting information; and
        displaying, by the client application on the display, the depiction of the first configuration of the particular virtual scene based, at least in part, on the first lighting information;
    in response to an event that changes configuration of the particular virtual scene from the first configuration to a second configuration, displaying, by the client application, on the display associated with the client device, a depiction of the second configuration of the particular virtual scene at least by:
        sending, from the client device, a second lighting information request to the cloud-based system for second lighting information for the second configuration of the particular virtual scene;
        in response to the second lighting information request, the client application obtaining from the cloud-based system the second lighting information; and
        displaying, by the client application on the display, the depiction of the second configuration of the particular virtual scene based, at least in part, on the second lighting
    information, wherein the first lighting information corresponds to the first configuration of the particular scene at a virtual scene level, and wherein additional frame-by-frame lighting information for frames of the depiction of the first configuration are generated locally by the client device based on the first lighting information, without requesting the frame-by-frame lighting information from the cloud-based system, until the event occurs.

2. The method of claim 1 further comprising, in response to the first lighting information request, the cloud-based system assigning one or more GPU-based instances, from a pool of GPU-based instances, to generate the first lighting information, wherein the pool of GPU-based instances services a plurality of requests from a plurality of different client computing devices.

3. The method of claim 2 further comprising, in response to completing generation of the first lighting information, the one or more GPU-based instances return to the pool and are made available for assignment of lighting information generation tasks requested by client applications executing on other client devices.

4. The method of claim 2 further comprising:
    in response to receiving the first lighting information request, the cloud-based system determining whether the first lighting information resides in a cache maintained by the cloud-based system; and
    the cloud-based system assigning the one or more GPU-based instances, from the pool of GPU-based instances, to generate the first lighting information, after determining that the first lighting information does not reside in the cache maintained by the cloud-based system.

5. The method of claim 4 further comprising, after the one or more GPU-based instances generate the first lighting information, the first lighting information is stored in the cache.

6. The method of claim 1 wherein the displaying the depiction of the first configuration of the particular virtual scene is performed by the client application using heightfield cone tracing.

7. The method of claim 1 wherein the first lighting information includes lit height fields and octahedral occlusion data.

8. The method of claim 1 wherein the first lighting information includes lightmaps.

9. The method of claim 1 wherein:
the cloud-based system uses a first set of one or more GPU-based instances, from a pool of GPU-based instances, to generate the first lighting information;
the cloud-based system uses a second set of one or more GPU-based instances, from the pool of GPU-based instances, to generate the second lighting information; and
the first set is different than the second set.

10. The method of claim 1 further comprising, in response to an event that changes configuration of the particular virtual scene from the second configuration to a third configuration, displaying, by the client application, on the display associated with the client device, a depiction of the third configuration of the particular virtual scene, without requesting additional lighting information from the cloud-based system, by locally generating a portion of lighting information and depicting the third configuration based, in part, on the portion of lighting information.

11. A computerized system comprising:
a client device executing a client application, wherein the client application includes code for:
displaying, by the client application, on a display associated with the client device, a depiction of a first configuration of a particular virtual scene at least by:
sending, from the client device, a first lighting information request to a cloud-based system for first lighting information for the first configuration of the particular virtual scene;
in response to the first lighting information request, the client application obtaining from the cloud-based system the first lighting information; and
displaying, by the client application on the display, the depiction of the first configuration of the particular virtual scene based, at least in part, on the first lighting information;
in response to an event that changes configuration of the particular virtual scene from the first configuration to a second configuration, displaying, by the client application, on the display associated with the client device, a depiction of the second configuration of the particular virtual scene at least by:
sending, from the client device, a second lighting information request to the cloud-based system for second lighting information for the second configuration of the particular virtual scene;
in response to the second lighting information request, the client application obtaining from the cloud-based system the second lighting information; and
displaying, by the client application on the display, the depiction of the second configuration of the particular virtual scene based, at least in part, on the second lighting
information, wherein the first lighting information corresponds to the first configuration of the particular scene at a virtual scene level, and wherein additional frame-by-frame lighting information for frames of the depiction of the first configuration are generated locally by the the client device based on the first lighting information, without requesting the frame-by-frame lighting information from the cloud-based system, until the event occurs.

12. The computerized system of claim 11 further comprising the cloud-based system, wherein the cloud-based system includes code for:
in response to the first lighting information request, the cloud-based system assigning one or more GPU-based instances, from a pool of GPU-based instances, to generate the first lighting information, wherein the pool of GPU-based instances services a plurality of requests from a plurality of different client computing devices.

13. The computerized system of claim 12 wherein the cloud-based system further comprises code for:
in response to completing generation of the first lighting information, the one or more GPU-based instances return to the pool and are made available for assignment of lighting information generation tasks requested by client applications executing on other client devices.

14. The computerized system of claim 12 wherein the cloud-based system further comprises code for:
in response to receiving the first lighting information request, the cloud-based system determining whether the first lighting information resides in a cache maintained by the cloud-based system; and
the cloud-based system assigning the one or more GPU-based instances, from the pool of GPU-based instances, to generate the first lighting information, after determining that the first lighting information does not reside in the cache maintained by the cloud-based system.

15. The computerized system of claim 14 wherein the cloud-based system further comprises code for: after the one or more GPU-based instances generate the first lighting information, the first lighting information is stored in the cache.

16. The computerized system of claim 11 wherein the displaying the depiction of the first configuration of the particular virtual scene is performed by the client application using height-field cone tracing.

17. The computerized system of claim 11 wherein the first lighting information includes lit height fields and octahedral occlusion data.

18. The computerized system of claim 11 wherein the first lighting information includes lightmaps.

19. The computerized system of claim 11 wherein:
the cloud-based system uses a first set of one or more GPU-based instances, from a pool of GPU-based instances, to generate the first lighting information;
the cloud-based system uses a second set of one or more GPU-based instances, from the pool of GPU-based instances, to generate the second lighting information; and
the first set is different than the second set.

20. The computerized system of claim 11 wherein the client application further includes code for:
in response to an event that changes configuration of the particular virtual scene from the second configuration to a third configuration, displaying, by the client application, on the display associated with the client device, a depiction of the third configuration of the particular virtual scene, without requesting additional lighting information from the cloud-based system, by locally generating a portion of lighting information and depicting the third configuration based, in part, on the portion of lighting information.

* * * * *